Figure 1:
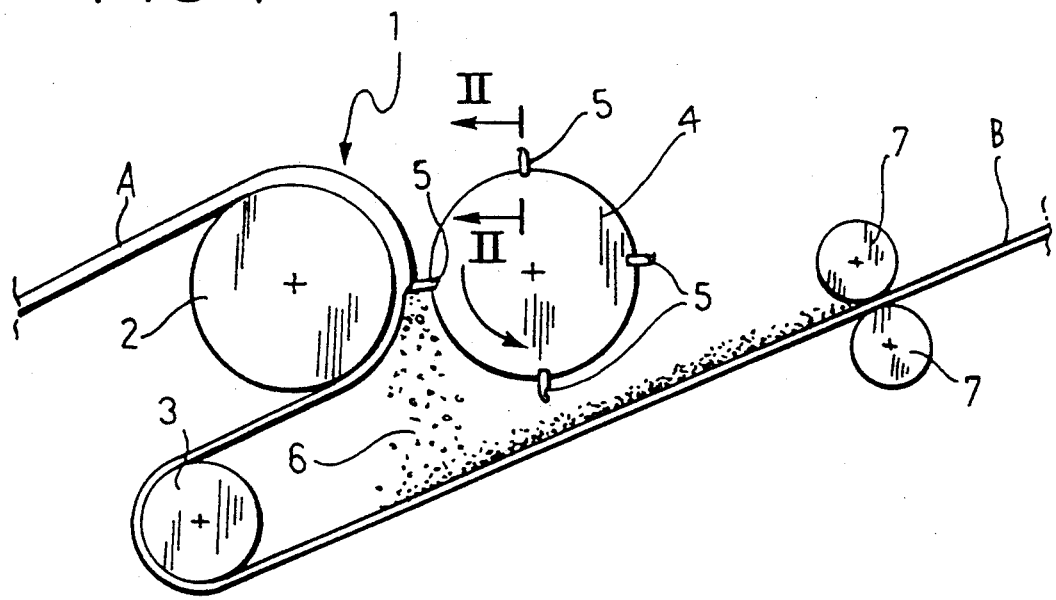

United States Patent [19]

Stroppiana

[11] Patent Number: 5,217,554
[45] Date of Patent: Jun. 8, 1993

[54] METHOD FOR PRODUCING GRAIN EFFECTS, VEINING OR MARBLING ON COVERING MATERIAL

[75] Inventor: Fernando Stroppiana, Gallo D'Alba, Italy

[73] Assignee: Mondo Spa, Turin, Italy

[21] Appl. No.: 745,135

[22] Filed: Aug. 15, 1991

[51] Int. Cl.⁵ .............................................. B32B 31/00
[52] U.S. Cl. .................................. 156/153; 156/256; 156/257; 156/279; 156/324; 264/115
[58] Field of Search ............. 156/153, 154, 279, 254, 156/296, 62.2, 324, 256, 257; 427/195; 428/143, 147; 264/DIG. 31, 109, 115, 123

[56] References Cited

U.S. PATENT DOCUMENTS

| | | |
|---|---|---|
| 2,775,994 | 1/1957 | Rowe . |
| 2,888,975 | 6/1959 | Benedict ................. 156/279 X |
| 3,152,002 | 10/1964 | Wisotzky et al. ............ 428/147 |
| 3,194,856 | 7/1965 | Palmer ..................... 156/279 X |
| 3,323,935 | 6/1967 | Snyder .................... 156/279 X |
| 3,356,634 | 12/1967 | McGinley ................. 428/147 X |
| 3,378,187 | 4/1968 | McKee et al. ............... 428/147 |
| 3,383,442 | 5/1968 | Mountain . |
| 4,917,750 | 4/1990 | Klose ........................ 156/254 |

FOREIGN PATENT DOCUMENTS 937266 9/1963 United Kingdom .

*Primary Examiner*—Jeff H. Aftergut
*Attorney, Agent, or Firm*—Evenson, McKeown, Edwards & Lenahan

[57] ABSTRACT

A covering sheet, which is preferably already marbled or veined, is subjected to a scraping operation resulting in the formation of shavings. The shavings are deposited on the previously scraped sheet and made to adhere thereto again, thus producing a substantially non-directional grain effect.

11 Claims, 2 Drawing Sheets

METHOD FOR PRODUCING GRAIN EFFECTS, VEINING OR MARBLING ON COVERING MATERIAL

DESCRIPTION

The present invention relates in general to coverings with special surface treatment, namely grain effects and the like (for example, marbling or veining) and has been developed with particular attention to its possible use in the field of coverings of rubber or of synthetic or artificial materials usable, for example, as floor coverings.

In this field, it is current practice to produce sheet coverings of rubber, polyvinyl chloride or other thermoplastic or thermosetting materials which have undergone an operation to give them a marbled or veined effect by producing more or less regular, sharp or blurred marks and lines on the covering material to create an effect more or less comparable to that of the veining of marble or wood.

The coverings are usually formed by the calendering of an extruded mass produced from materials of different colors. A marbling effect oriented substantially in the direction of the calendering operation is thus obtained. In practice, this means that the marks and lines characteristic of this effect may be longer or shorter, and more or less close together, but are always oriented in a predominant direction which is that in which the calendering operation takes place. Moreover, it is known, for example, in the production of linoleum, to divide the material output from the calendering operation into thin longitudinal strips whilst it is still plastic and to rearrange the strips transverse the length of the sheet and then subject the whole to a further calendering operation.

This method is rather complex and does not eliminate the problem indicated above since it simply achieves a different orientation of the predominant direction of the grain.

Another solution sometimes used is to incorporate granules of various shapes, consistencies and colors directly into the mixture used to form the covering sheet. More precisely, the sheet is produced by a calendering operation followed by a surface-finishing of the calendered sheet in order to produce a pattern or effect represented by the granules on the surface.

Finally, another solution is to form granules or small cubes of various shapes and colors and then deposit them on a substrate and subject the composite thus produced to a pressing operation to produce a final product with an appearance approximately similar to that of a grained covering.

For various reasons, this technique is quite complex to carry out.

In the first place, the distribution of the granules has to be regulated very precisely in order to produce a uniform final product.

In the second place, the air in the spaces between the granules has to be eliminated during the pressing without giving rise to residual porosity which could promote the accumulation of dirt on the covering and make it more difficult to clean.

Moreover, particularly with intrinsically plastic materials (e.g. rubber), it is very difficult to produce the granules, except by fairly sophisticated processes (for example, the formation of small cubes in a cooled environment). Furthermore, once they have been granulated, these materials have an intrinsic tendency to clump which makes their deposition even more difficult.

Finally, the aesthetic effect achieved cannot be said to be wholly satisfactory, since the grain pattern is constituted essentially by separate areas of different colors without the gradual colour changes, blurring or mixing achieved in some natural grains.

The particular object of the present invention is to provide a way of producing coverings with surface effects and the like (for example, grain marbling or veining) which are substantially free of directional characteristics and the other defects mentioned above, all by way of an intrinsically simple operation which not require substantial modification of the equipment and devices already in use for producing covering sheets.

According to the present invention, this object is achieved by virtue of a method having the characteristics recited in the following claims.

A further subject of the present invention is a device which can carry out the method.

Figure 2:
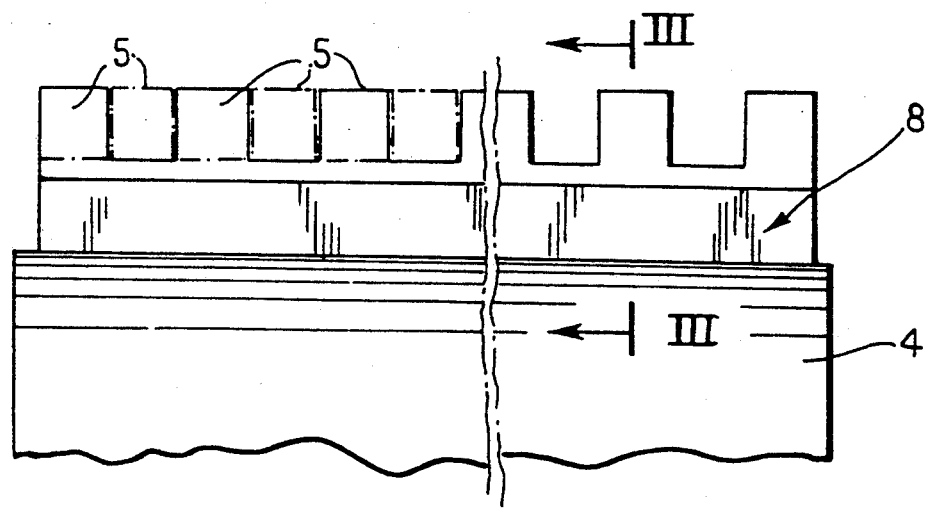
Figure 3:
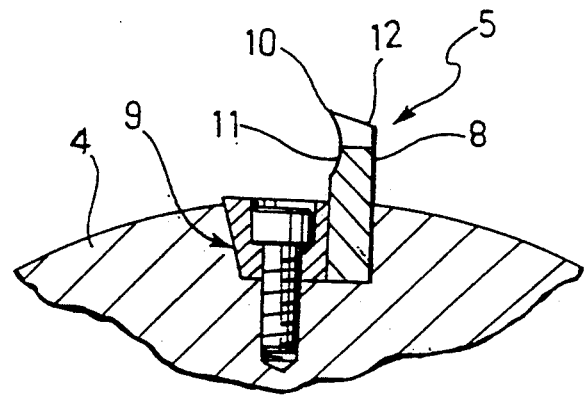
Figure 4:
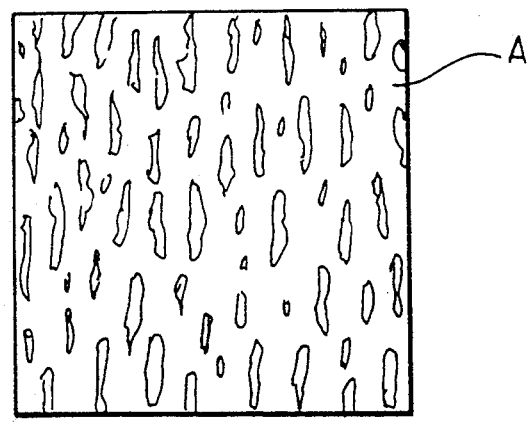
Figure 5:
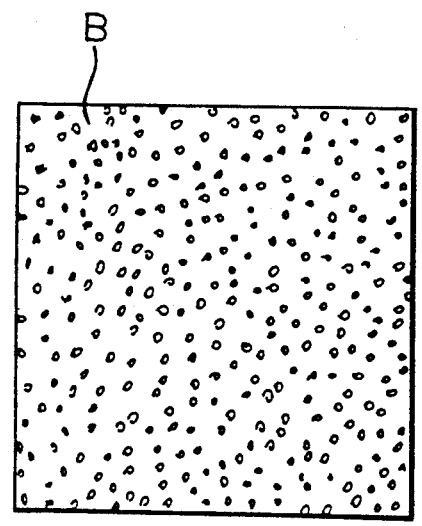

The invention will now be described, purely by way of non-limiting example, with reference to the appended drawings, in which:

FIG. 1 is a schematic, side elevational view of the structure of a device for producing sheet coverings according to the invention, FIG. 2 is a section taken on the line II—II of FIG. 1, on an enlarged scale, FIG. 3 is a section taken on the line III—III of FIG. 2, on an enlarged scale, and FIGS. 4 and 5 show the characteristics of two covering sheets at two successive stages of the method according to the invention.

In the drawing, a device for treating calendered sheet materials is generally indicated 1 and may, to advantage, be connected, as an output stage, to a calendering line (of known type, not shown in the drawings) for the continuous or substantially continuous production of a sheet of covering material A which is intended to be used as the starting material for the method according to the invention.

The starting sheet A preferably, but not strictly necessarily, already has marbling or veining produced by a known technique. The marbling or veining of a sheet of this type thus extends generally longitudinally, that is, in the direction in which the calendering operation by which it is produced takes place. An example of the surface appearance of such a sheet A is shown in FIG. 4.

The sheet A passes (downwardly in the embodiment shown) around a first roller, indicated 2, with a horizontal axis so as to be directed towards a further, return roller 3 also with a horizontal axis.

A further roller 4 with a horizontal axis, opposite the first roller 2, has tooth-like formations which, in general, have cutting edges and are of a length (measured radially of the roller 4 and in relation to the thickness of the sheet A and the distance apart of the surfaces of the rollers 2 and 4) such that the formations 5 can penetrate the sheet A slightly so as to achieve a distinct scraping (or milling) effect thereon.

For example, as shown in FIGS. 2 and 3, the teeth 5 may be grouped on a plurality of straight blades 8 (for example, four blades) disposed in respective recesses 9 spaced uniformly around the periphery of the roller 4 and extending along respective generatrices thereof.

The blades 8 are generally crenellated, so to speak, the teeth 5 constituting the crenellations.

In particular, as shown schematically in broken outline in FIG. 2, the teeth 5 of two successive blades 8 are offset so that the teeth of a given blade act on regions of the sheet A which are not affected by the action of the teeth of the blade immediately upstream.

The teeth 5 may be mounted in various ways, however, according to techniques used, for example, in rotary mills, planing machines, etc.

The profiles of the teeth 5 (in a plane transverse the axis of the roller 4) usually have a front cutting edge 10 which is intended to act on the sheet A, with a frontal undercut surface 11 (of cylindrical profile) and a dorsal undercut surface 12, respectively. The shapes of the undercut surfaces 11 and 12, as well as the width of the tooth 5 (axially of the drum 4), may be varied selectively, however, in dependence on the final result to be achieved, particularly as regards its aesthetic appearance.

The senses (and speeds) of rotation of the rollers 2 and 4 are selected so that the formations 5 effectively move relative to the sheet A so as to form and remove therefrom shavings 6 which fall freely onto the underlying pass of the sheet A against which they are then compressed. After it has passed around the return roller 3, the sheet A advances further substantially in the direction in which it advanced into the device 1 and continues towards a pair of further, contrarotating rollers 7 arranged above and below the sheet respectively, or towards a continuous vulcanising (rotocure) unit, so that the shavings 6 are compressed or pressed against the surface of the sheet A which was scraped or milled by the teeth 5.

For this purpose (that is, in order to facilitate the incorporation of the shavings 6 into the sheet), the rollers 7 may, to advantage, be heated so as at least partially to melt the shavings 6 which are thus anchored firmly to the body of the sheet. The surface of the sheet B output by the pair of pressing rollers 7 (or the rotocure unit) thus has a grain effect more or less comparable to that shown in FIG. 5.

This effect is achieved essentially as a result of the shavings 6 falling freely and consequently being reincorporated into the sheet. This produces an overall grain effect which, unlike that of the starting sheet A, has no directional characteristics or appearance longitudinally of the sheet.

The fact that the shavings 6 which have just been formed fall freely in order to be compressed against the underlying sheet ensures completely uniform distribution without the need for complex metering operations.

In the second place, the shavings can be produced easily by scraping (milling) even from very plastic materials (e.g. rubber), even when operating at ambient temperature. Their immediate deposition on the underlying sheet creates neither storage and accumulation problems nor the consequent risks of clumping.

Moreover, the shavings 6 produced by scraping are quite thin (of the order of tenths of a millimeter), and hence extremely flexible, and can consequently be compressed very easily without the risk of trapping quantities of air.

Finally, the final aesthetic effect is that of a grain with many color-change effects and much blurring and mixing of different colors.

Furthermore, it should be noted that, although it is preferred, the solution of reincorporating the shavings 6 scraped or milled from the sheet A into the sheet from which they were formed is not strictly essential in order put the invention into practice. In fact, one could consider a solution in which the shavings 6 produced by scraping or milling are deposited on a different substrate in order to produce the desired final result, or even a solution in which the shavings 6 are compressed to produce a covering sheet directly without the use of a substrate.

As already stated, the final characteristics of the grain of the sheet B (that is, essentially, the lengths, orientations, shapes and characteristics of the marks or lines which give rise to the grain effect) depend on the shapes of the shavings 6 produced by the teeth 5. This shape depends in turn on a series of factors, amongst which may be mentioned:
the shapes of the teeth 5,
the dimensions of the teeth,
the distribution thereof (their so-called density) on the external surface of the roller 4,
the speed at which the scraping operation is carried out, and
the depths of the incisions.

In the embodiment to which FIG. 1 relates the starting sheet A which passes around the roller 2 advances at a linear velocity (that is, a velocity tangential to the roller 2) of the order of 0.6 m/minute. The sense of rotation of the roller 2, which, from the viewpoint of FIG. 1, is clockwise, is such that the starting sheet A advances from left to right.

The roller 4, however, is rotated anticlockwise (by a respective motor, not shown) at a speed such that the teeth 5 have a linear velocity (tangential to the roller 4) of the order of 100 m/minute and hence substantially faster than the speed of advance of the sheet A.

In an embodiment which has been found particularly advantageous, the teeth 5 penetrate the sheet A to a depth of the order of 1 mm (for example, 0.6–1.2 mm).

In tests carried out by the Applicant, sheets such as linoleum sheets 2–2.5 and 3.2 mm thick were used as the starting sheet A and already had marbling or veining such as that shown in FIG. 4.

The teeth 5 used had front cutting edges 10 about 4 mm long (with the teeth 6 mm apart) axially of the roller 4. The tools 5 were distributed on the roller 4 on four blades 8 angularly spaced 90° apart around its periphery.

Naturally, the principle of the invention remaining the same, the details of construction and forms of embodiment may be varied widely with respect to those described and illustrated, without thereby departing form the scope of the present invention.

I claim:

1. A method of forming coverings with a decorative surface effect, including the steps of:
    providing a continuous substrate,
    subjecting the continuous substrate to an operation resulting in formation of multiple shavings and a continuous gathering substrate,
    collecting the shavings on said gathering substrate, and subjecting the shavings to a compression operation against said gathering substrate so as to produce a covering with the decorative surface effect comprising at least one of grain effects, marbling and veining.

2. A method according to claim 1, wherein the continuous substrate has a surface subjected to the operation forming the shavings such that the surface has a grain effect.

3. A method according to claim 1, wherein the operation for forming the shavings is carried out by at least one toothed cutting tool.

4. A method according to claim 3, wherein the operation for forming the shavings is carried out by at least one rotary tool.

5. A method according to claim 1, wherein the shavings are collected for the compression operation as they fall freely from the operation for forming the shavings.

6. A method according to claim 1, wherein the compression operation is carried out with the application of heat to the shavings.

7. A method according to claim 1, wherein the continuous substrate is rubber, synthetic materials or artificial materials.

8. A method according to claim 7, wherein the continuous substrate is linoleum.

9. A method according to claim 1, wherein at least one of the continuous substrate and the covering is in sheet form.

10. A method according to claim 1, wherein the covering subjected to the compression operation is the covering being subjected at the same time to the operation for forming the shavings.

11. In a method of forming coverings with a decorative surface effect, including the steps of forming multiple shavings and a continuous gathering substrate, collecting the shavings on said gathering substrate, and subjecting the shavings to a compression operation against said gathering substrate so as to produce a covering with the decorative surface effect, the improvement comprising the step of providing a continuous substrate and subjecting the continuous substrate to an operation resulting in simultaneous formation of said shavings and said gathering substrate, whereby said decorative surface effect comprises at least one of grain effects, marbling and veining.

* * * * *